United States Patent
Watanabe

(10) Patent No.: US 9,398,189 B2
(45) Date of Patent: Jul. 19, 2016

(54) IMAGE FORMING APPARATUS, AND METHOD AND PROGRAM FOR CONTROLLING PARALLEL PROCESSING

(71) Applicant: Konica Minolta, Inc., Chiyoda-ku, Tokyo (JP)

(72) Inventor: Yukio Watanabe, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/857,011

(22) Filed: Sep. 17, 2015

(65) Prior Publication Data
US 2016/0088183 A1 Mar. 24, 2016

(30) Foreign Application Priority Data
Sep. 18, 2014 (JP) ................. 2014-190076

(51) Int. Cl.
*G06F 15/00* (2006.01)
*G06F 3/12* (2006.01)
*G06K 1/00* (2006.01)
*H04N 1/32* (2006.01)
*H04N 1/00* (2006.01)

(52) U.S. Cl.
CPC ....... *H04N 1/32587* (2013.01); *H04N 1/00681* (2013.01); *H04N 1/32598* (2013.01); *H04N 2201/0093* (2013.01)

(58) Field of Classification Search
USPC .................................. 358/1.1–1.18
See application file for complete search history.

(56) References Cited

U.S. PATENT DOCUMENTS

| 8,928,914 B2 * | 1/2015 | Takenaka ........... G06K 15/1857 |
| | | 358/1.13 |
| 8,976,373 B2 * | 3/2015 | Nogawa ................. G06T 11/60 |
| | | 358/1.1 |

FOREIGN PATENT DOCUMENTS

JP 2010-226283 A 10/2010

* cited by examiner

*Primary Examiner* — Douglas Tran
(74) *Attorney, Agent, or Firm* — Buchanan Ingersoll & Rooney PC

(57) ABSTRACT

An image forming apparatus includes a processor including a CPU formed with a plurality of cores, the CPU performing processes, wherein a CPU core managing unit operates at least one predetermined core by a first control method involving relatively frequent process switching through task switching, and operates the other one or more cores than the at least one predetermined core by a second control method involving relatively less frequent process switching, and when a first process requiring communication with a device outside the processor and a second process not requiring communication with a device outside the processor are performed in parallel, the CPU core managing unit causes the at least one predetermined core to perform the first process, and causes the at least one predetermined core and the other one or more cores to perform the second process.

12 Claims, 5 Drawing Sheets

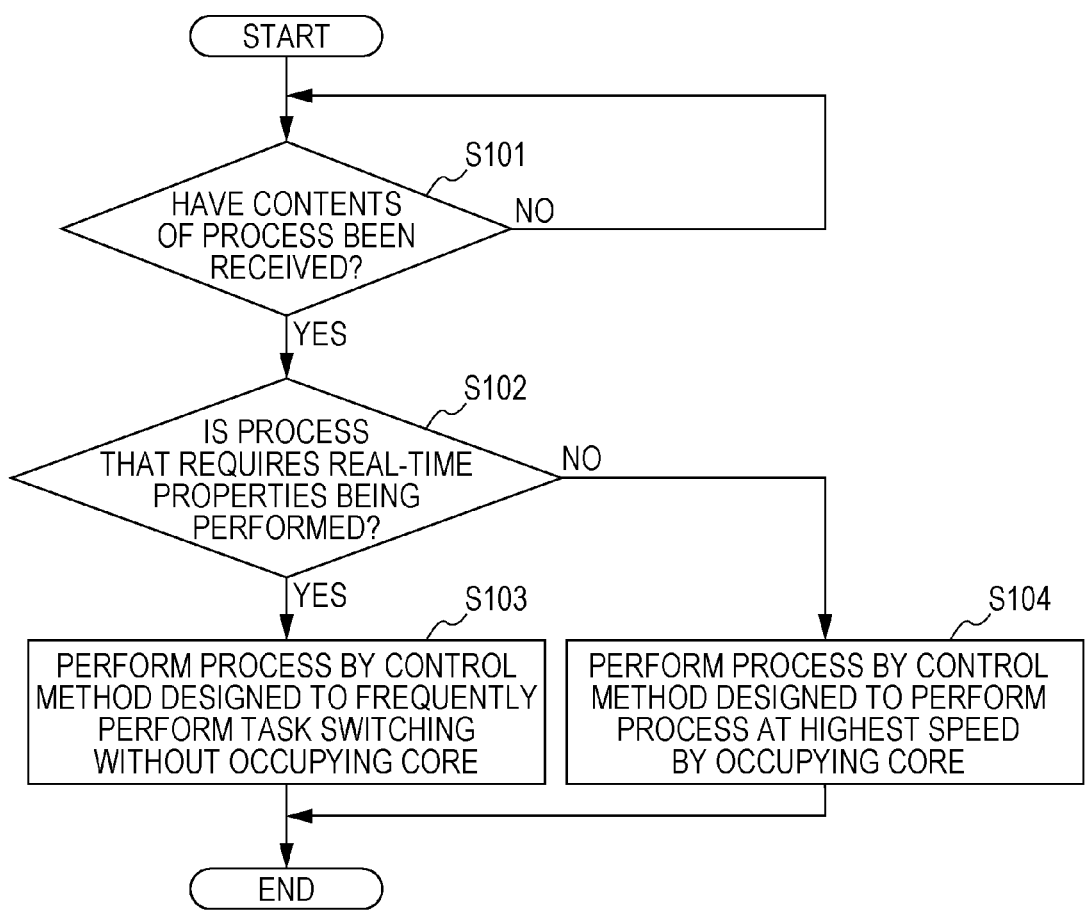

IMAGE FORMING APPARATUS, AND METHOD AND PROGRAM FOR CONTROLLING PARALLEL PROCESSING

The entire disclosure of Japanese Patent Application No. 2014-190076 filed on Sep. 18, 2014 including description, claims, drawings, and abstract are incorporated herein by reference in its entirety.

BACKGROUND OF THE INVENTION

1. Field of the Invention

The present invention relates to an image forming apparatus, and a method and a program for controlling parallel processing, and more particularly, to an image forming apparatus including a CPU (Central Processing Unit) formed with cores, and a method and a program for controlling parallel processing in the image forming apparatus.

2. Description of the Related Art

A CPU having more than one core (called a multi-core CPU or many-core CPU), instead of a CPU having one core, is used as the CPU to be mounted in an image forming apparatus such as an MFP (Multi Function Peripheral) these days. Methods of performing processes with cores include a first method that uses different functions of the respective cores, and a second method that distributes a process among the cores in accordance with the load.

As for the method that uses the functions of the respective cores, JP 2010-226283 A discloses an information processing apparatus that includes: an operation display unit that receives an instruction input concerning an operation and displays various kinds of items; an image processing unit that processes image information; and a processor that includes cores of the same type. In this information processing apparatus, one of the cores of the processor is invariably made to control a process that does not require real-time properties and relates to the operation display unit, and the other one of the cores of the processor is invariably made to control a process that needs to cooperate with the above process and relates to the image processing unit.

By the above mentioned first method, the respective cores execute respective functions. Therefore, some of the cores hardly perform any process depending on the operating condition of the image forming apparatus, and the cores cannot be effectively used. As a result, the processing speed cannot be increased. By the second method, on the other hand, any core is not limited to one function, and accordingly, the cores can be effectively used. However, each of the cores is made to perform various kinds of processes, and therefore, it is difficult to optimize a process.

Processes to be performed by a CPU include a process that requires high speed (or a process that can be performed without communication with any other device such as a sensor), and a process that requires real-time properties (or a process that is performed during communication with some other device such as a sensor). In a case where these processes coexist, if the process that requires high speed is preferentially optimized, process switching such as task switching is not conducted, and a predetermined process is continuously performed. By this method, however, task switching cannot be conducted, and a compound operation cannot be performed. In a case where the process that requires real-time properties is preferentially optimized, the process is performed while task switching is conducted. By this method, however, the task switching is controlled by scheduling of the OS (Operating System), and therefore, a series of processes is suspended from time to time.

That is, in a case where there coexist a process that requires high speed and a process that requires real-time properties, real-time properties in processing cannot be secured if priority is given to the process that requires high speed, and high speed in processing cannot be secured if priority is given to the process that requires real-time properties. As a result, it is not possible to achieve both high speed and real-time properties for the processes.

According to JP 2010-226283 A, control on the process that does not require real-time properties (or requires high speed) is assigned to one of the cores, and control on the process that needs cooperation (or requires real-time properties) is assigned to the other core. By this technique, however, the other core is made to perform only the control on the process that needs cooperation, and the other core is not adequately operated. Therefore, the control on the process that does not require real-time properties cannot be performed at high speed.

SUMMARY OF THE INVENTION

The present invention has been made in view of the above problems, and a main object thereof is to provide an image forming apparatus that can achieve both high speed and real-time properties in processing in a case where parallel processing is performed with cores, a method of controlling the parallel processing, and a program for controlling the parallel processing.

To achieve the abovementioned object, according to an aspect, an image forming apparatus reflecting one aspect of the present invention comprises a processor including a CPU formed with a plurality of cores, the CPU performing processes, wherein a CPU core managing unit configured to manage the cores operates at least one predetermined core among the cores by a first control method involving relatively frequent process switching through task switching in an OS operated by the CPU, and operates the other one or more cores than the at least one predetermined core by a second control method involving relatively less frequent process switching through the task switching, and when a first process requiring communication with a device outside the processor and a second process not requiring communication with a device outside the processor are performed in parallel, the CPU core managing unit causes the at least one predetermined core to perform the first process, and causes the at least one predetermined core and the other one or more cores to perform the second process, the second process being distributed among the at least one predetermined core and the other one or more cores.

To achieve the abovementioned object, according to an aspect, a method of controlling parallel processing in an image forming apparatus that includes a processor including a CPU formed with a plurality of cores, the CPU performing processes, at least one predetermined core among the cores being operated by a first control method involving relatively frequent process switching through task switching in an OS operated by the CPU, the other one or more cores than the at least one predetermined core being operated by a second control method involving relatively less frequent process switching through the task switching, when a first process requiring communication with a device outside the processor and a second process not requiring communication with a device outside the processor are performed in parallel, the method reflecting one aspect of the present invention comprises: a first step of causing the at least one predetermined core to perform the first process; and a second step of distributing the second process among the at least one predetermined core and the other one or more cores, and causing the at least one predetermined core and the other one or more cores to perform the second process.

To achieve the abovementioned object, according to an aspect, a non-transitory recording medium storing a computer readable parallel processing control program to be executed by a core in an apparatus that includes a processor including a CPU formed with a plurality of cores, at least one predetermined core among the cores being operated by a first control method involving relatively frequent process switching through task switching in an OS operated by the CPU, the other one or more cores than the at least one predetermined core being operated by a second control method involving relatively less frequent process switching through the task switching, when a first process requiring communication with a device outside the processor and a second process not requiring communication with a device outside the processor are performed in parallel, the parallel processing control program reflecting one aspect of the present invention causes the apparatus to carry out: a first step of causing the at least one predetermined core to perform the first process; and a second step of distributing the second process among the at least one predetermined core and the other one or more cores, and causing the at least one predetermined core and the other one or more cores to perform the second process.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a flowchart of operation of the image forming apparatus (or a CPU core managing unit) according to the embodiment of the present invention;

DESCRIPTION OF THE PREFERRED EMBODIMENTS

Figure 1A:
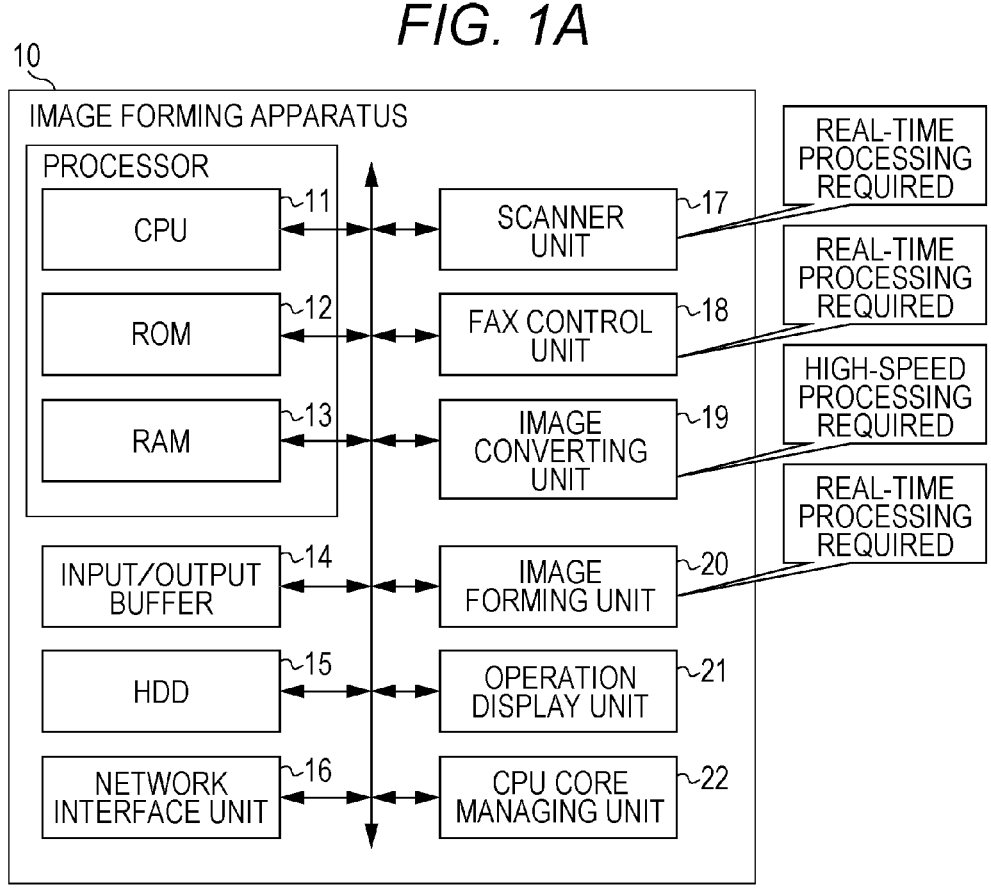
FIGS. 1A and 1B are block diagrams showing the structure of an image forming apparatus according to an embodiment of the present invention.

Hereinafter, an embodiment of the present invention will be described with reference to the drawings. However, the scope of the invention is not limited to the illustrated examples.

As described in the description of the related art, methods of performing processes with cores include a first method using different functions of respective cores, and a second method that distributes a process among cores in accordance with the load.

By the first method, cores are not effectively used, and the processing speed is not increased. By the second method, cores can be effectively used, but it is difficult to optimize a process. In a case where there coexist a process that requires high speed and a process that requires real-time properties, if the process that requires high speed is preferentially optimized, task switching cannot be performed, and a compound operation cannot be performed. If the process that requires real-time properties is preferentially optimized, on the other hand, a series of processes is suspended from time to time due to task switching.

According to JP 2010-226283 A, a process that requires high speed and a process that requires real-time properties are assigned to different cores from each other. By this method, however, the core to which the process that requires real-time properties is assigned is not adequately operated, and therefore, the process that requires high speed cannot be efficiently performed.

Particularly, in an image forming apparatus such as an MFP, there coexist a process that requires communication with a device (such as a sensor or a modem) outside the processor (or a process that requires real-time properties, also called a real-time process or the like), such as a FAX process, a scanning process, or an image forming process, and a process that does not require communication with any device outside the processor (or a process that requires high speed, also called a non-real-time process or the like), such as a process to convert PDL (Page Description Language) data into image data (a PDL process). Therefore, there is a demand for suggestion of a method for efficiently performing those processes.

Therefore, in an embodiment of the present invention, when a first process that requires communication with a device outside the processor and a second process that does not require communication with any device outside the processor are processed in parallel by cores, at least one predetermined core is operated by a first control method for performing a process while conducting task switching, and the other one or more cores excluding the predetermined core(s) are operated by a second control method for performing a process while restraining task switching, so that the first process is performed by the predetermined core (s), and the second process is distributed among and is performed by the predetermined core(s) and the other one or more cores (or the predetermined core (s) is made to perform not only the first process but also the second process).

In a case where a second process is performed by a predetermined core, if the data amount of the second process assigned to the predetermined core becomes larger, the processing is delayed, and high speed cannot be secured for the second process. Therefore, the predetermined core is made to perform a process involving a small data amount (data on a page-by-page basis, data on a band-by-band basis formed by dividing a page, or data with a small data amount in the data on the page-by-page basis or the band-by-band basis, in a PDL process, for example).

As described above, where a process that requires high speed is also assigned to a core performing a process that requires real-time properties while performing task switching, both high speed and real-time properties in processing can be achieved.

EXAMPLE

Figure 3:
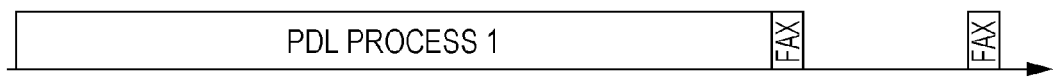
FIG. 3 is a diagram for explaining a method of controlling parallel processing (a control method in a case where priorities are given to speed) in the image forming apparatus according to the embodiment of the present invention.
Figure 4:
FIG. 4 is a diagram for explaining a method of controlling parallel processing (a control method in a case where priorities are given to real-time properties) in the image forming apparatus according to the embodiment of the present invention.
Figure 5:
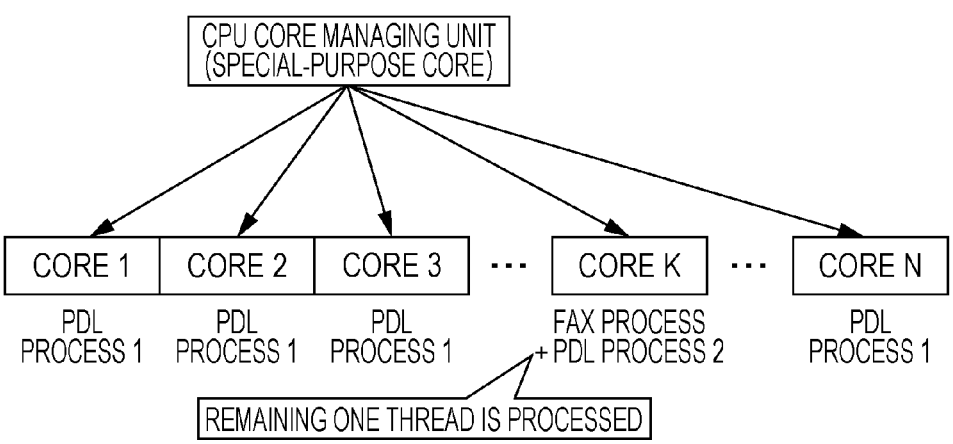
FIG. 5 is a diagram for explaining a specific example of a method of controlling parallel processing in the image forming apparatus according to the embodiment of the present invention.
Figure 6:
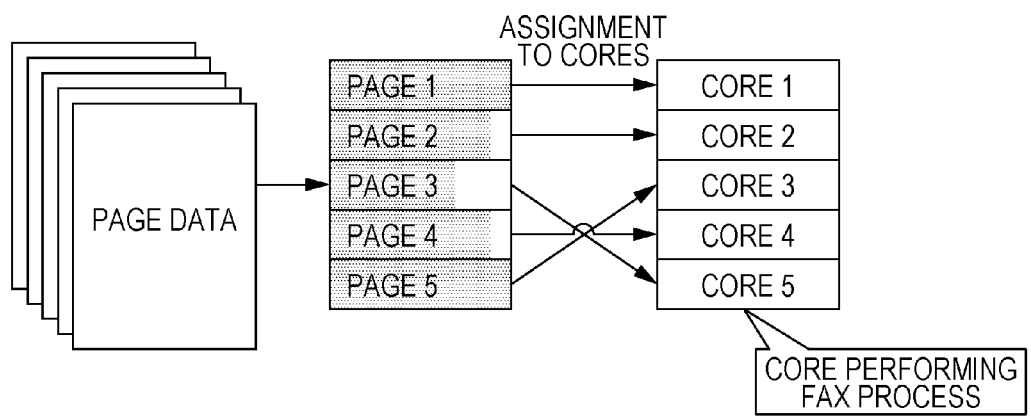
FIG. 6 is a diagram for explaining a method of assigning processes with cores (assigning data on a page basis)
Figure 7:
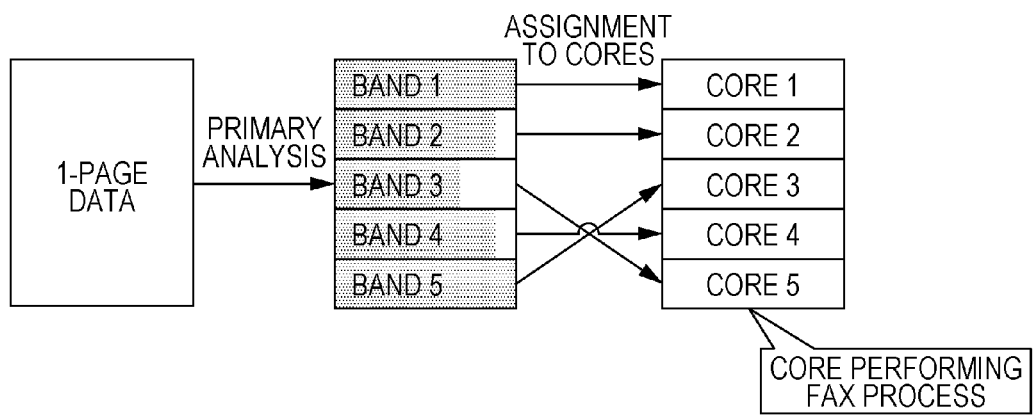
FIG. 7 is a diagram for explaining a method of assigning processes among cores (assigning data on a band basis)

To explain the above described embodiment of the present invention in greater detail, an image forming apparatus and a method and a program for controlling parallel processing according to an example of the present invention are described, with reference to FIGS. 1 to 8. FIGS. 1A and 1B are block diagrams showing the structure of the image forming apparatus of this example. FIG. 2 is a flowchart showing operation of the image forming apparatus of this example. FIGS. 3 to 5 are diagrams for explaining a method of controlling parallel processing. FIGS. 6 and 7 are diagrams for explaining methods of assigning processes to cores. FIGS. 8A and 8B are diagrams for explaining the processing times in cases where parallel processing is performed with more than one core.

The image forming apparatus 10 of this example is a compound machine such as an MFP, or a printer, and, as shown in FIG. 1A, includes a CPU 11, a ROM (Read Only Memory) 12, a RAM (Random Access Memory) 13, an input/output buffer 14, an HDD (Hard Disk Drive) 15, a network interface unit 16, a scanner unit 17, a FAX control unit 18, an image converting unit 19, an image forming unit 20, an operation display unit 21, and a CPU core managing unit 22.

Figure 1B:
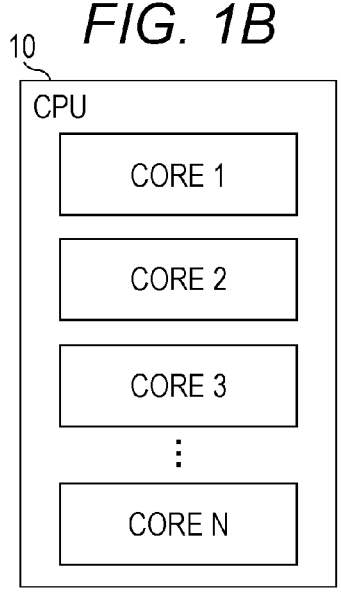

A processor is formed with the CPU 11 and memories such as the ROM 12 and the RAM 13. The CPU 11 is a data processing device that performs operation in accordance with a program, and is formed with cores (one to N cores in this example), as shown in FIG. 1B. The ROM 12 stores programs for controlling operation of the entire image forming apparatus 10 (including the parallel processing control program described later), font data, and the like. The RAM 13 stores the data required by the CPU 11 performing control, the data required to be temporarily stored during a control operation, and the like. The cores may be of the same type (same in size, structure, and processing capacity), or may differ in size, structure, and processing capacity.

The input/output buffer 14 is a memory for temporarily storing input data and data to be output, and stores image data to be output from the scanner unit 17, FAX image data received or to be transmitted by the FAX control unit 18, and the like.

The HDD 15 stores print data (PDL data written in a page-description language such as PJL (Printer Job Language), PS (PostScript), or PCL (Printer Control Language), or PDF (Portable Document Format) data) obtained from an external computer device, intermediate data (a display list) generated from the print data, image data generated from the display list, and the like.

The network interface unit 16 is a modem for connecting to a telephone line, an NIC (Network Interface Card) for connecting to an internal communication network such as a LAN (Local Area Network), or the like, and enables FAX communication with a FAX device via a telephone line and communication with a computer device via an internal communication network.

The scanner unit 17 is a component that optically reads image data from an original document placed on a platen, includes an image sensor such as a CCD (Charge Coupled Device) that converts light reflected from the original document into an electrical signal and an A/D converter that performs A/D conversion on the electrical signal, and outputs the image data read from the original document to the input/output buffer 14 or the image converting unit 19.

The FAX control unit 18 controls the network interface unit 16, to perform a caller ID display response (including the process prior to determination as to whether the call should be rejected, and the process prior to output of a primary response signal in reply to a signal for activating an information receiving terminal), a regular receiving process (such as the process prior to reception of FAX image data, the process prior to establishment of a call connection, and the process prior to output of a primary response signal in reply to a call signal), a process of transmitting/receiving FAX image data, and the like, and outputs received FAX image data to the input/output buffer 14, the image converting unit 19, or the image forming unit 20.

The image converting unit 19 performs image processing, such as an edge enhancement process, a smoothing process, and a color conversion process, on the image data of an original document read by the scanner unit 17, or FAX image data received by the FAX control unit 18 as necessary. When obtaining print data written in PDL, the image converting unit 19 generates the image data of each page by rasterizing each of the pages contained in the print data, and performs the above described image processing on the generated image data. The image data subjected to the image processing is then output to the image forming unit 20.

The image forming unit 20 performs a printing process on a paper sheet based on the image data subjected to the image processing by the image converting unit 19 or FAX image data obtained from the FAX control unit 18. Specifically, in the case of the electrophotography, technology, a photosensitive drum charged by a charging device is irradiated with light from an exposure device in accordance with the image, so that an electrostatic latent image is formed. The electrostatic latent image is developed by a development device applying charged toner thereto. The toner image is transferred onto a transfer belt by primary transfer, is transferred onto a paper sheet by secondary transfer, and is fixed on the paper sheet by a fixing device.

The operation display unit 21 includes a touch panel on which an operation unit such as a touch sensor formed with a lattice-like transparent electrode on a display unit such as a LCD (Liquid Crystal Display) is placed, hard keys, and the like. The operation display unit 21 displays an operation screen of the image forming apparatus, receives an operation from a user, and outputs a signal corresponding to the operation to the processor.

The CPU core managing unit 22 determines assignment to the cores in accordance with the processes to be performed. The CPU core managing unit 22 also detects abnormality among the cores, and controls timing among the cores, for example. Specifically, the CPU core managing unit 22 determines whether each of the cores is to be operated by a control method for performing processes in real time while performing task switching (the first control method), or whether each of the cores is to be operated by a control method for performing processes at a high speed while restraining task switching (the second control method). In a case where a process that requires communication with a device outside the processor (a process that requires real-time properties, which is called a first process), and a process that does not require communication with a device outside the processor (a process that requires high speed, which is called a second process) are performed in parallel, a core operated by the first control method is made to perform the first process as well as the second process, and a core operated by the second control method is made to perform the second process. Devices outside the processor include devices such as sensors and modems provided in the scanner unit 17, the FAX control unit 18, and the image forming unit 20, and exclude storage devices such as the RAM 13 in the processor (as well as the input/output buffer 14 and the HDD 15 in some cases).

The control by the CPU core managing unit 22 is now described in detail. In a scanning operation, the image sensor scans an original document while moving, and outputs image data. Therefore, the core controlling the scanner unit 17 receives image data and stores the image data into the input/output buffer 14 in synchronization with the movement of the image sensor. Otherwise, some of the image data remains uncaptured. That is, this core performs the scanning process while communicating with the image sensor, and therefore, the scanning process is a first process that requires communication with a device outside the processor.

In a FAX process, the modem of the network interface unit 16 transmits/receives based on a detected signal. Therefore, the core controlling the FAX control unit 18 transmits/receives FAX image data and stores the FAX image data into the input/output buffer 14 in synchronization with the operation of the modem. Otherwise, some of the FAX image data remains uncaptured. That is, this core performs the FAX process while communicating with the modem, and therefore, the FAX process is a first process that requires communication with a device outside the processor.

In an image forming process, an image is formed while a paper sheet is moved on the conveyance path. Therefore, the core controlling the image forming unit 20 cannot appropriately form an image based on image data on a paper sheet unless operating the exposure device and the development device in accordance with the position of the paper sheet detected based on a signal that is output from the sensor controlling the sheet conveyance system. Further, the image formed on the paper sheet cannot be appropriately fixed unless the fixing device is operated in accordance with the temperature detected based on a signal that is output from a temperature sensor attached to the fixing device. That is, this core performs the image forming process while communicating with the sensor that detects the position of a paper sheet and the sensor that measures the temperature of the fixing device. Therefore, the image forming process is a first process that requires communication with a device outside the processor.

Meanwhile, an image conversion process such as an imaging process or a PDL process is performed inside the image converting unit 19. Therefore, the core controlling the image converting unit 19 stores data generated during a process (intermediate data generated from PDL data, for example) into the RAM 13, and retrieves the data from the RAM 13, but does not need to communicate with any device outside the processor, such as one of the above mentioned sensors or modems. That is, this core performs the image conversion process without communication with any sensor or modem, and therefore, the image conversion process is a second process that does not require communication with any device outside the processor.

In a case where a first process that requires communication with a device outside the processor, such as a scanning process, a FAX process, or an image forming process, and a second process that does not require communication with any device outside the processor, such as a PDL process, are performed in parallel, the first process and the second process can be assigned to different cores from each other. However, where the first process is assigned to a predetermined core, and the second process is assigned to the remaining cores, the predetermined core having the first process assigned thereto cannot be adequately operated. That is, the first process is a process to be performed while communication with a device outside the processor is performed, and the predetermined core in a standby state hardly functions. Therefore, the processing capacity of the predetermined core cannot be fully utilized. In view of this, the CPU core managing unit 22 controls the predetermined core to perform not only the first process but also the second process, so that the processing capacity of the predetermined core is fully utilized. In other words, the CPU core managing unit 22 performs control so that the second process is distributed among and is performed by the cores including the predetermined core.

The CPU core managing unit 22 may be formed as hardware, or a parallel processing control program for causing the processor to function as the CPU core managing unit 22 may be formed, and be executed by one of the cores in the CPU 11.

Referring now to FIG. 2, a method of controlling parallel processing in the image forming apparatus 10 having the above described structure is described. The CPU 11 loads the parallel processing control program from the ROM 12 or the HDD 15 into the RAM 13, and executes the parallel processing control program, to carry out the procedures in the respective steps shown in the flowchart in FIG. 2.

First, the CPU core managing unit 22 receives, from the CPU 11, the contents of a process to be performed by the CPU 11 (Yes in S101), and determines whether any of the cores in the CPU 11 is performing a process that requires real-time properties (a process that requires communication with a device outside the processor, such as a FAX process) (S102).

If one of the cores in the CPU 11 is performing a process that requires real-time properties, the process is performed by a control method that is designed to be able to frequency perform task switching without occupying any core (S103). If none of the cores in the CPU 11 is performing a process that requires real-time properties, on the other hand, the process is performed by a control method that is designed to be able to perform the process at the highest speed by occupying a core (S104).

The above control method is now described in detail.

First, the core assignment method is described. In the control according to this example, the processing speed can be made higher in a case where each core is not assigned to a function (any core is not occupied). As for a specific function that is operated at a high frequency, however, real-time properties of processes can be maintained and the user-friendliness of the image forming apparatus 10 can be increased in a case where a core is occupied. In view of this, a specific function that is operated at a high frequency is prevented from occupying a core (a second process is not assigned to the core).

For example, the CPU core managing unit 22 and the operation display unit 21 are operated at a high frequency and are required to respond at a high speed. Therefore, the same core is assigned exclusively to the CPU core managing unit 22 and the operation display unit 21. The image forming unit 20 is also operated at a high speed, and a core is assigned exclusively to the image forming unit 20. Meanwhile, the FAX control unit 18 and the scanner unit 17 are not used at a high frequency, and the load on the CPU 11 is low when the FAX control unit 18 or the scanner unit 17 is operating. Therefore, so as to realize effective usage of the cores, it is not preferable to assign a core exclusively to the FAX control unit 18 and the scanner unit 17. In view of this, any core is not assigned exclusively to the FAX control unit 18 and the scanner unit 17, and the FAX control unit 18 and the scanner unit 17 share a core with the image converting unit 19.

Next, the core control method is described. An example case where a core performing a process that requires real-time properties (a FAX process in this case) is made to perform a process that requires high speed (a PDL process in this case) is now described. As shown in FIG. 3, where the core is operated while task switching is restrained, the PDL process ends in a short time, but the FAX process is not performed before the end of the PDL process. As a result, the FAX process is delayed. This control method is a control method for increasing speed (the second control method), and is not applied to the core that performs FAX control that requires real-time properties. In a case where the core is operated while task switching is frequently performed, as shown in FIG. 4, processing can be appropriately switched to the FAX process, and accordingly, FAX communication can be performed, regardless of real-time properties. This control method is a control method that takes into account the OS scheduling such as task switching (the first control method), and is applied to the core that performs FAX control that requires real-time properties.

In a specific example case where only a process that requires high speed is performed, the second control method for increasing speed is used, and the process is distributed among the available cores (all the cores, except for the cores assigned to the CPU core managing unit 22 and the operation display unit 21, and the core assigned to the image forming unit 20). During a FAX process, however, the first control method is applied to (N−1) cores, and the second control method is applied to the core performing the FAX process (a core K in this case), as shown in FIG. 5. That is, as a way of using cores excluding the cores assigned exclusively to the CPU core managing unit 22, the operation display unit 21, and the image forming unit 20, a PDL process is performed not with (N−1) threads but with N threads during the FAX operation. In this manner, all the N cores are effectively used, and the PDL process can be completed in a short time.

In a case where the PDL process is performed with N threads, the PDL processes to be performed with the respective threads may be the same among the N cores. In a case where the N cores are of the same type, however, the load on the core performing the FAX process is larger than that on each other core. Therefore, so as to reduce the load on the core performing the FAX process, the data amount in the PDL process to be performed by this core is preferably small.

As shown in FIG. 6, the data to be handled by the program for the PDL process 2 assigned to the core (a core 5 in the drawing) performing a FAX process is set as the data of a page unit, or is set as the page data (the data of page 3 in the drawing) of the page having the smallest data amount (represented by a shaded region in the drawing), for example. As shown in FIG. 7, the data to be handled by the program for the PDL process 2 assigned to the core (also the core 5 in the drawing) performing a FAX process is set as a unit formed by dividing one page into bands after the primary analysis is finished, or is set as the band data (the data of band 3 in the drawing) having the smallest data amount (represented by a shaded region in the drawing), for example.

Accordingly, a core performing a process that requires real-time properties (a process that requires communication with a device outside the processor) can complete the process in a shorter time or in a slightly longer time than the other cores, and can achieve both real-time properties of the process and high speed.

Figure 8A:
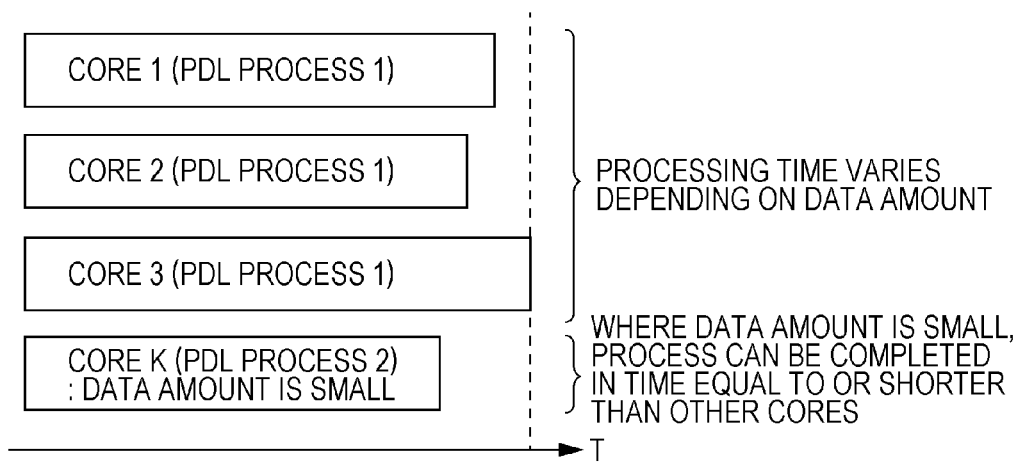
FIGS. 8A and 8B are diagrams for explaining processing times in cases where parallel processing is performed by cores.
Figure 8B:
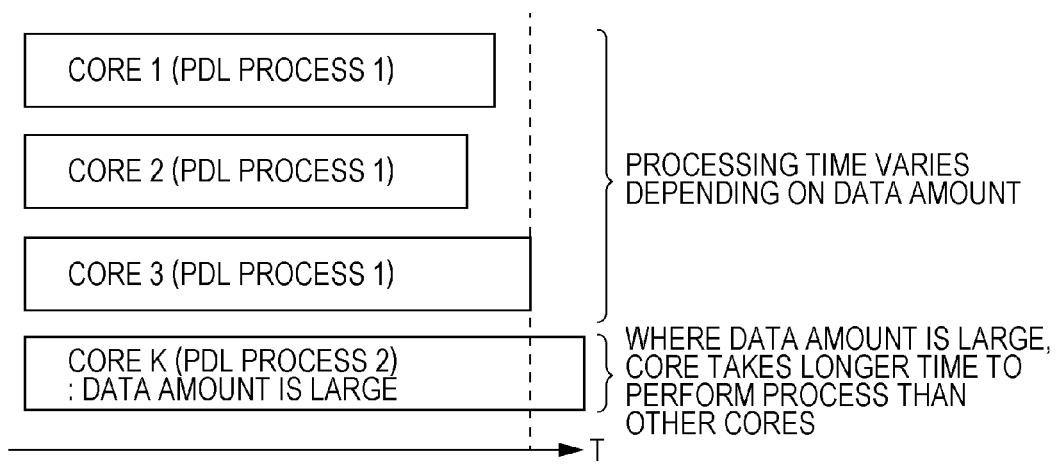

In a case where a process that requires high speed (a process that does not require communication with any device outside the processor) is distributed, it is not possible to move on to the next process before all the cores complete the process. Therefore, if a process with a large data amount is assigned to a core performing a process that requires real-time properties, the entire processing time becomes longer. In a case where a process with a small data amount is assigned to a core (the core K) performing a process that requires real-time properties, as shown in FIG. 8A, the entire processing time does not become longer. However, in a case where a process with a large data amount is assigned to the core K, as shown in FIG. 8B, the core K takes a longer time to complete the process than the other cores, and the entire processing time becomes longer.

So as to avoid such a situation, the CPU core managing unit 22 preferably calculates the load on a core performing a process that requires real-time properties, and, in accordance with the load, adjusts the data amount of the process that requires high speed and is to be assigned to the core. When a process that requires real-time properties is performed, the load of a core varies (a core awaiting communication with a device hardly functions). Therefore, the load of a core is preferably calculated based on the processing time while awaiting communication with a device, the number of commands written in the program for performing the process, and the like.

As described above, when a process that requires real-time properties (a first process that requires communication with a device outside the processor) and a process that requires high speed (a second process that does not require communication with any device outside the processor) are processed in parallel, at least one predetermined core is operated by the first control method for performing a process while conducting task switching, and the other one or more cores excluding the predetermined core (s) are operated by the second control method for performing a process while restraining task switching, so that the predetermined core (s) is made to perform not only the first process but also the second process, and the other core (s) is made to perform the second process. In this manner, the real-time properties of the process and high speed can be achieved at the same time.

The present invention is not limited to the above described example, and any appropriate modifications can be made to the configuration and the control, without departing from the scope of the present invention.

For example, in the above described example, a FAX process, a scanning process, and an image forming process are taken as examples of processes that require communication with a device outside the processor, and a PDL process is taken as an example of a process that does not require communication with any device outside the processor. However, processes are not limited to the above. Other examples of processes that require communication with a device outside the processor include post processing such as punching and stapling to be performed in synchronization with the image forming unit 20, and other examples of processes that do not require communication with any device outside the processor include image processing such as an edge enhancement process, a smoothing process, and a color conversion process. The control operation according to the present invention can also be applied to those processes.

Although one core is made to perform a process that requires communication with a device outside the processor in the above described example, two or more cores may be made to perform a process that requires communication with a device outside the processor, or each of the two or more cores may be made to perform processes that require communication with a device outside the processor.

In the above described example, a process that does not require communication with any device outside the processor is not assigned to the core performing processes for the CPU core managing unit 22 and the operation display unit 21 and the core performing a process for the image forming unit 20 (these cores are occupied). However, in a case where the load on these cores is small, a process that does not require communication with any device outside the processor can be assigned to these cores.

Although the cores are of the same type (are the same in size, structure, and processing capacity) in the above described example, the cores may differ in size, structure, and processing capacity, and any core can be made to perform both a process that requires communication with a device outside the processor and a process that does not require communication with any device outside the processor.

Although a method of controlling parallel processing in the image forming apparatus 10 has been described in the above example, the present invention can also be applied to any apparatus in which the processor includes a CPU formed with cores, and parallel processing involving a process that requires communication with a device outside the processor and a process that does not require communication with any device outside the processor is controlled by the CPU.

The present invention can be applied to an image forming apparatus that includes a processor including a CPU formed with cores, a method of controlling parallel processing in the image forming apparatus, a parallel processing control program to be executed in the image forming apparatus, and a recording medium storing the parallel processing control program.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising
a processor including a CPU (Central Processing Unit) formed with a plurality of cores, the CPU performing processes,
wherein
a CPU core managing unit configured to manage the cores operates at least one predetermined core among the cores by a first control method involving relatively frequent process switching through task switching in an OS (Operating System) operated by the CPU, and
operates the other one or more cores than the at least one predetermined core by a second control method involving relatively less frequent process switching through the task switching, and
when a first process requiring communication with a device outside the processor and a second process not requiring communication with a device outside the processor are performed in parallel,
the CPU core managing unit causes the at least one predetermined core to perform the first process, and causes the at least one predetermined core and the other one or more cores to perform the second process, the second process being distributed among the at least one predetermined core and the other one or more cores.

2. The image forming apparatus according to claim 1, wherein
the second process is a PDL process to generate image data by rasterizing data of each page written in PDL (Page Description Language), and
the CPU core managing unit causes the at least one predetermined core and the other one or more cores to process data on a page-by-page basis or data on a band-by-band basis generated by dividing each page into bands.

3. The image forming apparatus according to claim 2, wherein the CPU core managing unit causes the at least one predetermined core to process the data on the page-by-page basis or the data on the band-by-band basis, the data on the page-by-page basis and the data on the band-by-band basis each having a smaller data amount than a data amount in each of the other one or more cores.

4. The image forming apparatus according to claim 1, wherein the first process is one or more processes selected from among a FAX process of transmitting/receiving FAX image data while communicating with a modem for connecting to a public network, a scanning process of acquiring image data while communicating with a sensor for scanning an original document, and an image forming process of forming an image on a paper sheet while communicating with a sensor for detecting a position of the paper sheet.

5. A method of controlling parallel processing in an image forming apparatus that includes a processor including a CPU (Central Processing Unit) formed with a plurality of cores, the CPU performing processes,
at least one predetermined core among the cores being operated by a first control method involving relatively frequent process switching through task switching in an OS (Operating System) operated by the CPU,
the other one or more cores than the at least one predetermined core being operated by a second control method involving relatively less frequent process switching through the task switching,
when a first process requiring communication with a device outside the processor and a second process not requiring communication with a device outside the processor are performed in parallel, the method comprising:
a first step of causing the at least one predetermined core to perform the first process; and
a second step of distributing the second process among the at least one predetermined core and the other one or more cores, and causing the at least one predetermined core and the other one or more cores to perform the second process.

6. The method according to claim 5, wherein
the second process is a PDL process to generate image data by rasterizing data of each page written in PDL (Page Description Language), and,
the second step includes causing the at least one predetermined core and the other one or more cores to process data on a page-by-page basis or data on a band-by-band basis generated by dividing each page into bands.

7. The method according to claim 6, wherein the second step includes causing the at least one predetermined core to process the data on the page-by-page basis or the data on the band-by-band basis, the data on the page-by-page basis and the data on the band-by-band basis each having a smaller data amount than a data amount in each of the other one or more cores.

8. The method according to claim 5, wherein the first process is one or more processes selected from among a FAX process of transmitting/receiving FAX image data while communicating with a modem for connecting to a public network, a scanning process of acquiring image data while communicating with a sensor for scanning an original document, and an image forming process of forming an image on a paper sheet while communicating with a sensor for detecting a position of the paper sheet.

9. A non-transitory recording medium storing a computer readable parallel processing control program to be executed by a core in an apparatus that includes a processor including a CPU (Central Processing Unit) formed with a plurality of cores,
at least one predetermined core among the cores being operated by a first control method involving relatively frequent process switching through task switching in an OS (Operating System) operated by the CPU, the other one or more cores than the at least one predetermined core being operated by a second control method involving relatively less frequent process switching through the task switching, when a first process requiring communication with a device outside the processor and a second process not requiring communication with a device outside the processor are performed in parallel, the parallel processing control program causing the apparatus to carry out:

a first step of causing the at least one predetermined core to perform the first process; and a second step of distributing the second process among the at least one predetermined core and the other one or more cores, and causing the at least one predetermined core and the other one or more cores to perform the second process.

10. The non-transitory recording medium storing a computer readable parallel processing control program according to claim 9, wherein the apparatus is an image forming apparatus, the second process is a PDL process to generate image data by rasterizing data of each page written in PDL (Page Description Language), and, the second step includes causing the at least one predetermined core and the other one or more cores to process data on a page-by-page basis or data on a band-by-band basis generated by dividing each page into bands.

11. The non-transitory recording medium storing a computer readable parallel processing control program according to claim 10, wherein the second step includes causing the at least one predetermined core to process the data on the page-by-page basis or the data on the band-by-band basis, the data on the page-by-page basis and the data on the band-by-band basis each having a smaller data amount than a data amount in each of the other one or more cores.

12. The non-transitory recording medium storing a computer readable parallel processing control program according to claim 9, wherein the apparatus is an image forming apparatus, and the first process is one or more processes selected from among a FAX process of transmitting/receiving FAX image data while communicating with a modem for connecting to a public network, a scanning process of acquiring image data while communicating with a sensor for scanning an original document, and an image forming process of forming an image on a paper sheet while communicating with a sensor for detecting a position of the paper sheet.

* * * * *